United States Patent
Dong (10) Patent No.: US 12,418,949 B2
(45) Date of Patent: Sep. 16, 2025

(54) MULTI-LINK COMMUNICATION METHOD AND APPARATUS, AND COMPUTER-READABLE STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 403 days.

(21) Appl. No.: 18/014,154

(22) PCT Filed: Jul. 31, 2020

(86) PCT No.: PCT/CN2020/106288
§ 371 (c)(1),
(2) Date: Dec. 31, 2022

(87) PCT Pub. No.: WO2022/021358
PCT Pub. Date: Feb. 3, 2022

(65) Prior Publication Data
US 2023/0262801 A1    Aug. 17, 2023

(51) Int. Cl.
*H04W 76/15* (2018.01)
(52) U.S. Cl.
CPC ................... *H04W 76/15* (2018.02)
(58) Field of Classification Search
CPC ...... H04W 76/15; H04W 76/11; H04W 76/28
See application file for complete search history.

(56) References Cited

U.S. PATENT DOCUMENTS

| 2009/0046673 A1* | 2/2009 | Kaidar | H04W 48/12 370/337 |
| 2011/0255401 A1 | 10/2011 | Seok | |
| 2013/0178202 A1* | 7/2013 | Ho | H04W 8/00 455/422.1 |

(Continued)

FOREIGN PATENT DOCUMENTS

| CN | 104125652 A | 10/2014 |
| CN | 108076503 A | 5/2018 |

(Continued)

OTHER PUBLICATIONS

International Search Report of PCT/CN2020/106288 dated May 8, 2021, with English translation, (4p).
Institute for Information Transmission Problems, Russian Academy of Sciences, et al.,"Modeling of Real-Time Multimedia Streaming in Wi-Fi Networks With Periodic Reservations",date of publication Mar. 18, 2020, date of current version Mar. 30, 2020, Digital Object Identifier 10.1109/Access.2020.2981838, (21p).

(Continued)

*Primary Examiner* — Sudesh M. Patidar
(74) *Attorney, Agent, or Firm* — Arch & Lake LLP; Hao Tan; Shen Wang (57) ABSTRACT

Multi-link communication methods and apparatuses, and a computer-readable storage medium are provided. In one multi-link communication method, a wireless access point (AP) sends, via at least one link among multiple links to a station (STA), a Quiet Time Period (QTP) response frame to the STA, where the QTP response frame includes at least a link parameter of at least one link for QTP among the multiple links, and the at least one link for QTP is a link under which the AP supports QTP. Furthermore, the QTP response frame is sent over a link of the multiple links, or the QTP response frame is sent over two links of the multiple links.

18 Claims, 4 Drawing Sheets

(56) References Cited

U.S. PATENT DOCUMENTS

| | | | | |
|---|---|---|---|---|
| 2021/0321243 | A1* | 10/2021 | Patil | H04W 48/10 |
| 2022/0131956 | A1* | 4/2022 | Li | H04L 69/14 |
| 2022/0338285 | A1* | 10/2022 | Zhou | H04W 8/24 |
| 2023/0007717 | A1* | 1/2023 | Gan | H04W 56/001 |

FOREIGN PATENT DOCUMENTS

| | | | |
|---|---|---|---|
| CN | 108810879 | A | 11/2018 |
| CN | 110168999 | A | 8/2019 |
| CN | 110719227 | A | 1/2020 |
| CN | 110768756 | A | 2/2020 |
| CN | 111385828 | A | 7/2020 |
| CN | 111405684 | A | 7/2020 |
| KR | 20180050807 | * | 5/2018 |
| KR | 20180050807 | A | 5/2018 |

| | | |
|---|---|---|
| WO | 2019027493 A1 | 2/2019 |

OTHER PUBLICATIONS

Notice of Allowance issued in CN Application No. 202080001473.7 dated Feb. 20, 2024 with English translation, (6p).

Evgeny Khorov et al., "Modeling of Real-Time Multimedia Streaming in Wi-Fi Networks With Periodic Reservations," IEEE Access, Digital Object Identifier 10.1109/Access.2020.2981838, Mar. 18, 2020, (21p).

Der-Jiunn Deng et al., "IEEE 802.11ax: Highly Efficient WLANs for Intelligent Information Infrastructure," IEEE Communications Magazine, vol. 55, No. 12, pp. 52-59, Dec. 13, 2017, (8p).

Wei Rong: "Analysis and innovation of IP telephony system technology," Decision and Information (Financial Observation), No. 6, Jun. 20, 2007 with English translation, (11p).

* cited by examiner

MULTI-LINK COMMUNICATION METHOD AND APPARATUS, AND COMPUTER-READABLE STORAGE MEDIUM

CROSS-REFERENCE TO RELATED APPLICATION

The present application is the U.S. National phase application of International Application No. PCT/CN2020/106288, filed on Jul. 31, 2020, the entire content of which is incorporated herein by reference for all purposes.

TECHNICAL FIELD

The present disclosure relates to the field of wireless communication technology, and in particular, to a multi-link communication method, apparatus, and computer-readable storage medium.

BACKGROUND

IEEE802.11 established study group (SG) IEEE802.11be to study the next generation of mainstream (802.11a/b/g/n/ac) Wi-Fi technology. The scope of the study is the transmission of a maximum bandwidth of 320 MHz, aggregation and cooperation of multiple frequency bands, etc. The proposal is to increase the rate and throughput by at least four times compared to the existing 802.11ax, the main application scenarios of which include video transmission, Augmented Reality (AR), Virtual Reality (VR), etc.

The aggregation and cooperation of multiple frequency bands refers to the communication between devices in 2.4 GHz, 5.8 GHz and 6-7 GHz bands at the same time, and the communication between devices in multiple bands at the same time requires the definition of a new Medium Access Control (MAC) mechanism to manage. In addition, another purpose of IEEE802.11be is to support low latency transmission.

802.11be will support a maximum bandwidth of 320 MHz (i.e., 160 MHz+160 MHz), which may be followed by 240 MHz (i.e., 160 MHz+80 MHz) and the bandwidth supported in 802.11ax.

Quiet Time Period (QTP) is defined in 802.11ax for peer to peer (STA-TO-STA) communication.

802.11be defines devices to be able to communicate under multiple links in order to improve the system throughput and spectrum efficiency, and 802.11be should also support peer to peer (STA-TO-STA) communication based on the above conclusion, while 802.11ax only defines QTP mechanism under single link, so it is not applicable to the needs of 802.11be, and needs to be enhanced.

SUMMARY

Aspects of the present disclosure may address at least the above problems and/or defects. Various embodiments of the present disclosure provide the following technical solutions.

According to a first aspect of the present disclosure, there is provided a multi-link communication method for a wireless access point (AP). The multi-link communication method may include: sending, via at least one link among multiple links to a station (STA), a Quiet Time Period (QTP) response frame to the STA, where the QTP response frame may include at least a link parameter of at least one link among the multiple links, and the at least one link is a link under which the AP supports QTP and where the QTP response frame is sent by a link of the multiple links, or the QTP response frame is sent by two links of the multiple links.

According to a second aspect of the present disclosure, there is provided a multi-link communication method for a station (STA). The multi-link communication method may include: receiving, via at least one link among multiple links to an AP, a QTP response frame from the AP, where the QTP response frame may include at least a link parameter of at least one link among the multiple links, and the at least one link is a link under which the AP supports QTP, where the QTP response frame is received by a link of the multiple links, or the QTP response frame is received by two links of the multiple links.

According to a third aspect of the present disclosure, there is provide an AP, including a memory, a processor, and a computer program stored in the memory and runnable on the processor, where the processor, when executing the computer program, implements the multi-link communication method for the AP according to the first aspect.

According to a fourth aspect of the present disclosure, there is provided a STA including: a memory, a processor, and a computer program stored in the memory and runnable on the processor, where the processor, when executing the computer program, implements the multi-link communication method for the STA according to the second aspect.

According to a fifth aspect of the present disclosure, there is provided a non-transitory computer-readable storage medium having a computer program stored thereon, where the computer program, when executed by a processor, causes the processor to implement the multi-link communication methods according to the first or second aspect.

It should be understood that the foregoing general description and the following detailed descriptions are exemplary only and do not limit the present disclosure.

BRIEF DESCRIPTION OF THE DRAWINGS

These and other features of embodiments of the present disclosure will become more apparent by describing exemplary embodiments of the present disclosure in detail with reference to the accompanying drawings.

Similar reference numerals are used throughout the accompanying drawings to depict the same or similar components, features, and structures.

DETAILED DESCRIPTION

The following description, with reference to the accompanying drawings, is provided to facilitate a full understanding of the various embodiments of the present disclosure as defined by the appended claims and their equivalents. Various embodiments of the present disclosure include various specific details, but such specific details are exemplary only. In addition, descriptions of well-known features and constructions may be omitted for the sake of clarity and conciseness.

The terms and words used in this disclosure are not limited to their written meaning, but are used by the inventors to enable a clear and consistent understanding of the disclosure. Accordingly, for those skilled in the art, the description of various embodiments of the present disclosure is provided for illustrative purposes only, and not for limiting purposes.

It will be understood by those skilled in the art that, unless specifically stated, the singular forms "one", "a", "an" and "the/said" as used herein may also include the plural form. It will be further understood that the wording "include" as used in the specification of this application refers to the presence of features, integers, steps, operations, components and/or assemblies, but does not exclude the presence or addition of one or more other features, integers, steps, operations, components, assemblies and/or groups thereof. It should be understood that when a component is referred to as being "connected" or "coupled" to another component, it may be directly connected or coupled to another component, or there may be an intermediate component between the component and the another component. In addition, "connected" or "coupled" as used herein may include wirelessly connected or wirelessly coupled. The word "and/or" as used herein includes all of one or more associated listed items, or any one of the one or more of the associated listed items or all combinations among the one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Unless otherwise defined, all terms used herein, including technical terms and scientific terms, have the same meaning as generally understood by one of ordinary skill in the art to which this disclosure belongs.

Wireless Access Point, i.e., AP, is used for wireless switch of wireless network, and also the core of wireless network. AP is the access point for mobile computer users to access the wired network, mainly used in broadband homes, inside buildings and inside campuses, and can cover tens to hundreds of meters. AP, also known as session point or access bridge, is a name with a very broad meaning, which can refer not only to simple wireless access points (wireless AP), but also a general term for other types of equipment such as wireless routers (including wireless gateway and wireless bridge).

AP devices can be used as wireless base stations are primarily used as bridges to connect wireless and wired networks. Wired and wireless networks can be integrated through the AP. The AP devices follow IEEE802.11 and IEEE802.11b and can support 11 Mbit/s, 5.5 Mbit/s, 2 Mbit/s and 1 Mbit/s, and can also support roaming function and encryption function of Extended Service Set Identifier (ESSID) and Wired Equivalent Privacy (WEP) to prevent unauthorized improper access. The enhanced AP devices also support isolation of users under the same AP, and supports Power over Ethernet function.

In the present disclosure, the communication scenario under multiple links represents the communication between simultaneously Transmit and receive (STR) multi-link device (MLD) AP and Non-STR MLD STA. As described above, STR MLD AP can represent an access point (AP) that can transmit and receive simultaneously under multiple links at the same time, and Non-STR MLD STA can represent a station (STA) that can transmit or receive simultaneously under multiple links at the same time. In other words, a STR MLD AP can perform both transmit and receive operations at the same time under multiple links, while a Non-STR MLD STA can perform only one of transmit and receive operations at the same time under multiple links.

The AP may include software applications and/or circuitry to enable other types of nodes in the wireless network to communicate with the outside and inside of the wireless network via the AP. In some examples, as an illustration, the AP may be a terminal device or network device equipped with a Wireless Fidelity (Wi-Fi) chip. As an illustration, the STAs may include, but are not limited to, cellular phones, smart phones, wearable devices, computers, personal digital assistants (PDAs), personal communication system (PCS) devices, personal information managers (PIMs), personal navigation devices (PNDs), global positioning systems, multimedia devices, Internet of Things (IoT) devices, and the like.

In the present disclosure, two links Link1 and Link2 between the STR MLD AP and the Non-STR MLD STA are used as examples of multiple links. However, it is not limited by the disclosure and may include more links. In addition, each link in the multiple links may correspond to a corresponding channel for transmitting various data and/or information.

Figure 1:
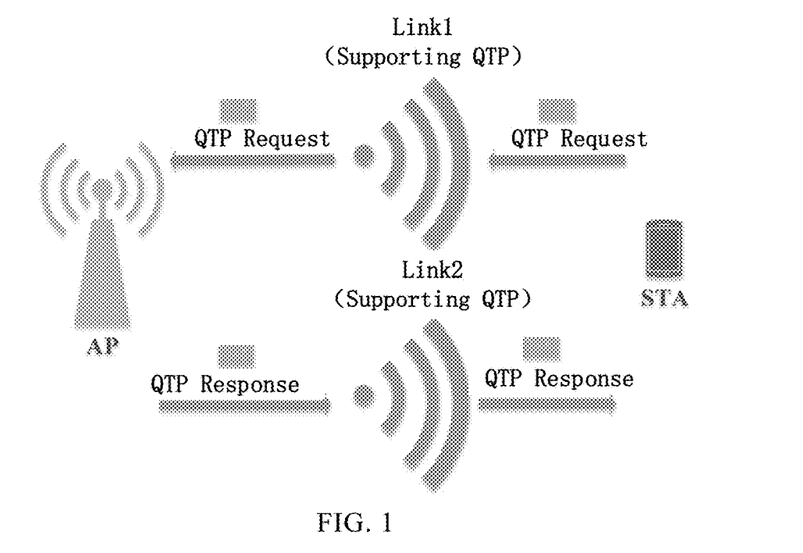
FIG. 1 is a schematic diagram of a multi-link communication scheme according to some embodiments of the present disclosure.

FIG. 1 shows a schematic diagram of a multi-link communication scheme according to some embodiments of the present disclosure.

Referring to FIG. 1, in the technical solution of the present disclosure, after the AP and STA establish, for example, multiple links including Link1 and Link2 that support QTP, the STA may send a QTP request frame containing the identifiers of Link1 and Link2 and the link parameters of Link1 and Link2 to the AP via Link1 and/or Link2, and after receiving the QTP request frame, the AP can send a QTP response frame to the STA via Link1 and/or Link2, thus completing the QTP configuration between the AP and the STA. Since the parameters about Link1 and Link2 can be interacted only through Link1 or Link2, channel resources can be saved, system load can be reduced, and system utilization can be improved.

In some embodiments of the present disclosure, the AP may send the QTP response frame to the STA via Link1 and/or Link2 to determine the QTP configuration. That is, the AP may send the QTP response frame to the STA based on an initial QTP configuration determined by the communication protocol, or the AP may send the QTP response frame to the STA based on a predetermined initial QTP configuration. In other embodiments of the present disclosure, the STA may send the QTP request frame to the AP via Link1 and/or Link2 to send the initial QTP configuration, and the AP may send the QTP response frame to the STA based on the received QTP request frame. In this way, the STA and the AP can negotiate the QTP configuration between them, and then each of the STA and the AP can apply the QTP configuration.

It should be noted that only Link1 and Link2 are used for ease of description, but in the technical solutions of the present disclosure, there is no limit to the number of multiple links, which may also include, for example, Link3, Link4 . . . . Linkn.

The operations at the AP side are described in detail below with reference to FIG. 2.

Figure 2:
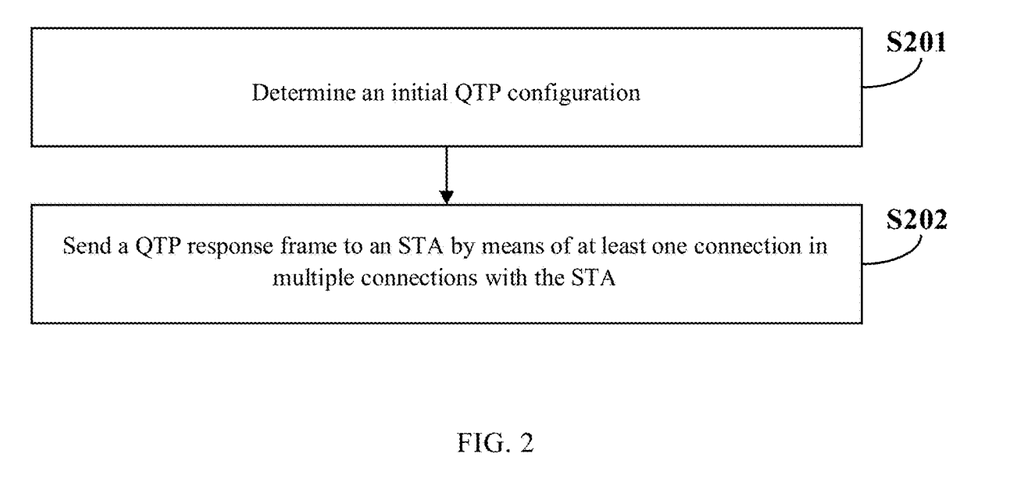
FIG. 2 is a flowchart of a multi-link communication method for an AP according to some embodiments of the present disclosure.

FIG. 2 is a flowchart of a multi-link communication method performed by an AP according to some embodiments of the present disclosure.

Referring to FIG. 2, the multi-link communication method performed by the AP according to some embodiments of the present disclosure may include the following steps.

S201, determining an initial QTP configuration.

S202, sending a QTP response frame to a STA via at least one link among multiple links to the STA.

In S201, the AP may determine the initial QTP configuration based on a communication protocol, or determine the initial QTP configuration based on a predetermined configuration, or determine the initial QTP configuration based on a QTP request frame received from the STA.

In some embodiments of the present disclosure, the initial QTP configuration includes at least: an identification of at least one link under which the STA supports QTP among the multiple links, and/or a link parameter of at least one link under which the STA supports QTP among the multiple links, and the at least one link is a link under which the AP supports QTP.

According to some embodiments, after the initial QTP configuration is determined (e.g., the initial QTP configuration is determined by receiving the QTP request frame from the STA), the AP obtains from the initial QTP configuration the identification of the at least one link among the multiple links and/or the link parameter of the at least one link among the multiple links to determine the QTP response frame. Here, the QTP response frame includes a link parameter of at least one link among the multiple links, and the at least one link is a link under which the AP supports QTP. The QTP response frame is sent to the STA via at least one link of the multiple links between the AP and the STA.

In some embodiments of the present disclosure, in response to the initial QTP configuration being determined based on the QTP request frame, the QTP response frame may be sent via a link same as a link under which the QTP request frame is received, or may be sent via a link different from the link under which the QTP request frame is received. That is, the at least one link is a link for sending the QTP response frame or is a link among the multiple links other than the link for sending the QTP response frame, or, the at least one link may be a link for receiving the QTP response frame and a link among the multiple links other than the link for sending the QTP response frame.

That is, according to some embodiments of the present disclosure, the QTP request frame and the QTP response frame can be sent and received using any one link among the multiple links between the AP and the STA. For example, if the multiple links are Link1 and Link2, the STA may use Link1 to send the QTP request frame to the AP, and the AP may use Link2 to send the QTP response frame to the STA; or the STA may use Link1 to send the QTP request frame to the AP, and the AP may use Link1 to send QTP response frame to the STA; or the STA may use Link2 to send the QTP request frame to the AP, and the AP may use Link2 to send the QTP response frame to the STA.

In some embodiments of the present disclosure, after the multi-link communication is established between the STA and the AP, the AP may send the QTP response frame and receive the QTP request frame and the STA may receive the QTP response frame and send the QTP request frame under each link in the multiple links. The QTP request frame and QTP response frame may be implemented in a QTP information element format. The QTP information elements are variable-length components for managing frames. The QTP information element format may contain Element ID (element identifier) field, Length (length) field, Element ID Extension (element identifier extension) field, Control (control) field, and a variable-length field (Quiet Time Content field), which is specified as follows:

TABLE 1

QTP information element format

| Element ID | Length | Element ID Extension | Control | Quiet Time Content |
|---|---|---|---|---|
| 1 | 1 | 1 | 1 | Variable |

According to some embodiments of the present disclosure, if the STA and the AP negotiate the QTP parameters of Link1 under one connection (e.g., Link1), i.e., the STA sends the QTP request frame and the AP sends the QTP response frame through Link1 only, the formats of the information elements of the QTP request frame and the QTP response frame interacted between the STA and the AP are shown in Table 2 and Table 3:

TABLE 2

Basic information element format of QTP request frame

| Dialog Token | Quiet Period Offset | Quiet Period Duration | Quiet Period interval | Repetition Count | Service Specific Identifier |
|---|---|---|---|---|---|
| 1 | 1 | 2 | 1 | 1 | 2 |

TABLE 3

Basic information element format of QTP response frame

| Dialog Token | Status Code | Quiet Period Offset | Quiet Period Duration | Quiet Period interval | Repetition Count | Service Specific Identifier |
|---|---|---|---|---|---|---|
| 1 | 1 | 1 | 2 | 1 | 1 | 2 |

In particular, the basic information element formats of the QTP request frame and the QTP response frame include the following fields.

Quiet Period.

Quiet Period can also be pre-scheduled at regular intervals. This field being 0 represents there is no pre-scheduled quiet period. This field being a non-zero value represents the number of Beacon intervals between each two quiet periods.

Quiet Period Duration.

Quiet Period does not have to last for a full Beacon interval, so the Quiet Period Duration field is used to specify the number of units of time for which the Quiet Period is intended to last, in units of 32 μs.

Quiet Period Offset.

Quiet Period does not have to start at a certain Beacon interval, so the Quiet Period Offset field is used to specify the number of units of time elapsed after the start of the Beacon interval before the next Quiet Period begins, and the value of the number of units of time is less than the Beacon interval time. The Quiet Period Offset field is set to the offset of the first QTP from the TBTT (Target Beacon Transmission Time) expressed in TUs.

Quite Period Interval field is set to the requested interval between the start of two consecutive QTPs, expressed in time units (TUs).

Status Code is used to identify the success or failure of an operation. If the operation is successful, the value of the field is set to 0; otherwise it is set to a non-zero value.

Repetition Count field is set to the number of requested QTPs. A repetition count equal to 0 indicates that the setup time of the QTP is for a one time operation. A repetition count equal to 0xFF (i.e., octal numeral 255) indicates that the setup of the QTP is canceled.

Service Specific Identifier field contains an identifier assigned by a peer-to-peer application to identify specific frame exchanges using peer-to-peer links during which HE STAs that have requested the participation of the specified frame exchanges might transmit data during quiet time period.

According to some embodiments of the present disclosure, the QTP request frame for negotiating QTP parameters of multiple links includes at least: an identification of at least one link under which the STA supports QTP among the multiple links, and/or a link parameter of at least one link under which the STA supports QTP among the multiple links. The link parameter includes at least a QTP time offset parameter corresponding to the link supporting QTP, for example, including Time offset that indicates a difference from the time at which the first QTP starts. Time offset setting of 0 indicates the simultaneous start of the multiple QTPs expressed in us.

According to some embodiments of the present disclosure, the QTP request frame for negotiating QTP parameters of multiple links includes at least: a link parameter of at least one link under which the AP supports QTP among the multiple links. The link parameter includes at least: a time offset parameter of the AP's corresponding QTP under the link, such as the time offset of QTP corresponding to Link1 and Link2. However, if sending and receiving the QTP request frame and QTP response frame via Link1 only, the link parameter in the QTP response frame include only the time offset of the AP's corresponding QTP under that link (i.e., Link1).

According to the embodiments of the present disclosure, the time offset values of different links are the time offset values relative to the same time reference point; or, the time offset of one link is the time offset value relative to the time offset value of another link. That is, time synchronization under each link and maintenance of a set of time synchronized clock parameters in AP multi-link device (MLD) is required.

The identification of the at least one link is denoted by "link" for indicating the identifier of each link.

According to the embodiments of the present disclosure, the link parameter included in the QTP response frame for negotiating QTP parameters of multiple links includes at least: a QTP time offset parameter corresponding to the link supporting QTP. That is, if both Link1 and Link2 support QTP, the link parameter of the QTP response frame includes at least: the QTP time offset parameters corresponding to Link1 and Link2 (i.e., Time offset of Link1 and Time offset of Link2).

The formats of the information elements of the QTP request frame and the QTP response frame used to negotiate QTP for multiple links under a single link are shown in Tables 4 and 5:

TABLE 4

Information element format of QTP request frame

| Dialog Token | Quiet Period Offset | Quiet Period Duration | Quiet Period interval | Repetition Count | SSI | Link1 | ... | Time Offset | Link2 |
|---|---|---|---|---|---|---|---|---|---|

TABLE 5

Information element format of QTP response frame

| Dialog Token | Status Code | Quiet Period Offset | Quiet Period Duration | Quiet Period interval | Repetition Count | SSI | Link1 | ... | Time Offset | Link2 |
|---|---|---|---|---|---|---|---|---|---|---|

According to the embodiments of the present disclosure, the time offset of the QTP supported by the STA, the time offset of the QTP supported by the AP, the identifier of the link under which the STA supports QTP in the multi-link communication, and the identifier of the link under which the AP supports QTP in the multi-link communication are the QTP communication parameters of at least one link among the multiple links, respectively.

Figure 3:
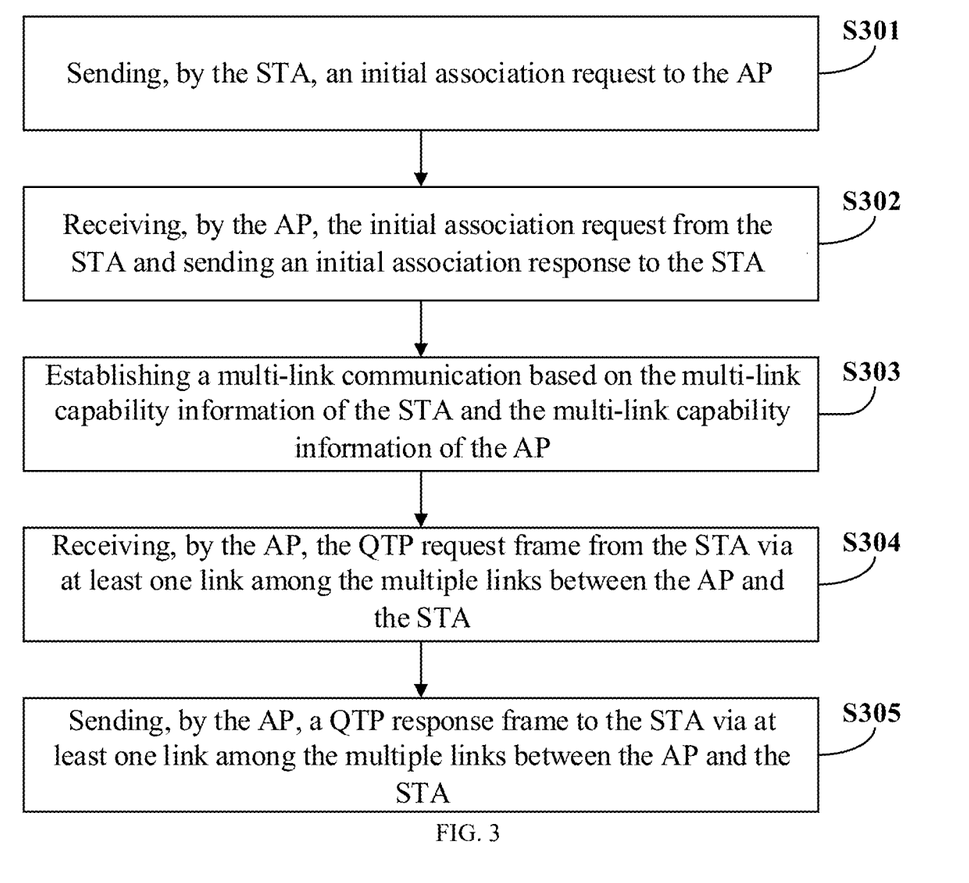
FIG. 3 is a flowchart of a multi-link communication method according to some embodiments of the present disclosure.

FIG. 3 is another flowchart of a multi-link communication method according to some embodiments of the present disclosure.

According to the embodiments of the present disclosure, referring to the flowchart of the multi-link communication method of the present disclosure of FIG. 2, prior to S201, the multi-link communication method further includes a process of establishing an initial association. The multi-link communication method further includes the following steps.

S301, sending, by the STA, an initial association request to the AP, where the initial association request contains multi-link capability information of the STA.

According to the embodiments of the present disclosure, the multi-link capability information includes: support for simultaneous transmissions and receptions of the multi-link communication; support for simultaneous transmissions or receptions of the multi-link communication; and support for transmission and reception of a single link (i.e., multi-link aware).

In the process of establishing the initial association, the STA finds a compatible network and authenticates, then sends an initial Association Request frame to the AP for initial access. A Capability Information field is used to indicate the type of network the mobile workstation is to join. Before receiving the association request, the AP verifies if the Capability Information, Service Set Identifier (SSID), and (Extended) Supported Rated fields match the network parameters. In addition, the AP also records the Listen Interval used by the workstation (i.e., the interval at which the mobile workstation listens for Beacon frames to monitor Traffic Indication Map (TIM) information). Workstations that support spectrum management have Power and Channel performance information elements, while workstations that support secure access have Robust Security Network (RSN) information elements.

S302, receiving, by the AP, the initial association request from the STA and sends an initial association response to the STA, where the initial association response contains multi-link capability information of the AP. When the STA attempts to connect to the AP, the AP replies with an initial Association Response. In the response, the AP assigns an Association ID (association identifier).

S303, establishing a multi-link communication based on the multi-link capability information of the STA and the multi-link capability information of the AP.

S304, after establishing multiple links between the AP and the STA, sending, by the STA, the QTP request frame to the AP via at least one link among the multiple links between the AP and the STA, and receiving, by the AP, the QTP request frame from the STA via at least one link among the multiple links between the AP and the STA.

S305, sending, by the AP, a QTP response frame to the STA via at least one link among the multiple links between the AP and the STA.

According to the embodiments of the present disclosure, the multi-link capability information of the STA and AP may also contain information on the number of multiple links supported by the STA and AP and information on the number of link(s) under which the STA and AP support QTP. For example, the AP and STA may communicate with each other in the 2.4 GHz, 5.8 GHz, and 6-7 GHz bands at the same time.

Figure 4:
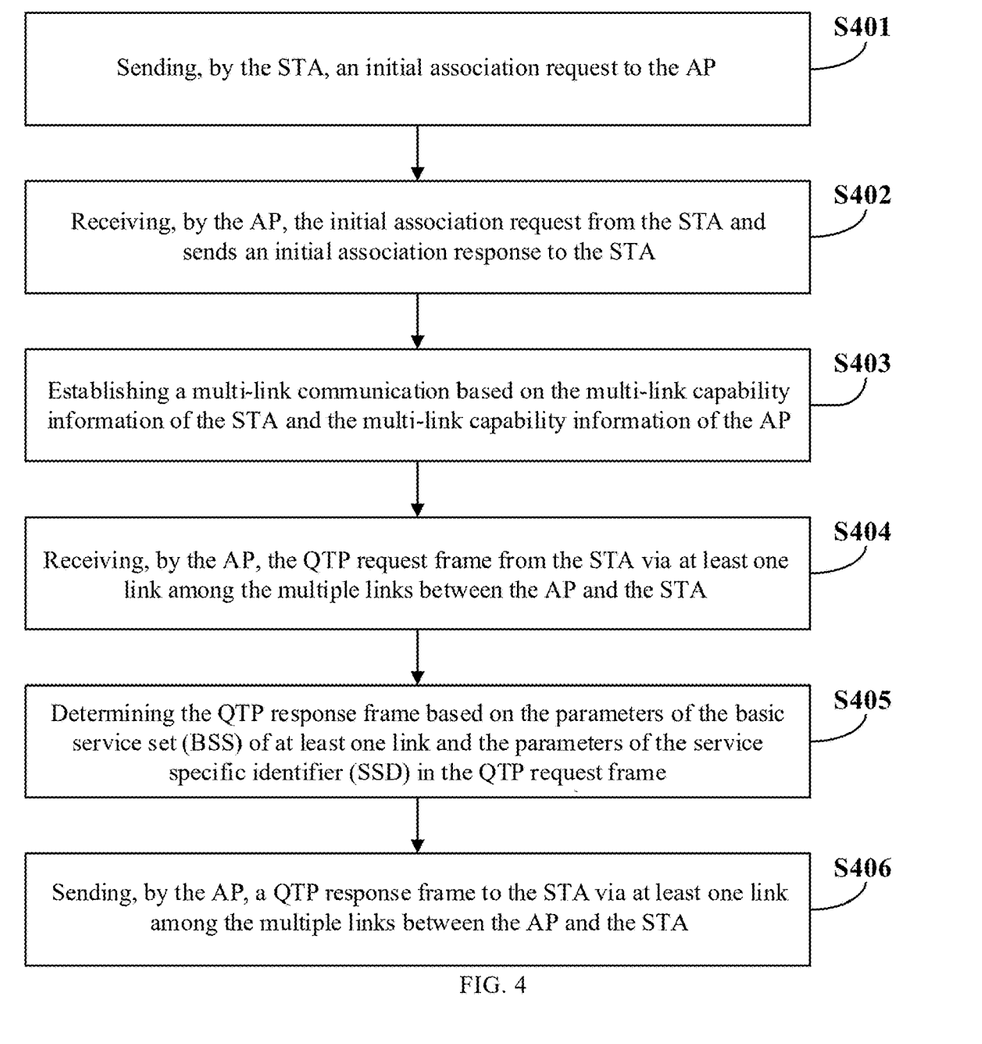
FIG. 4 is a flowchart of a multi-link communication method according to some embodiments of the present disclosure.

FIG. 4 is a flowchart of a multi-link communication method according to some embodiments of the present disclosure.

Referring to FIG. 4, prior to S305 of FIG. 3, the multi-link communication method further includes the following steps.

S405, determining, by the AP, the QTP response frame based on a parameter of a basic service set (BSS) of at least one link and a parameter of a service specific identifier (SSD) in the QTP request frame.

According to the embodiments of the present disclosure, after the AP receives the QTP request from the STA, the AP determines the QTP response frame based on the identification of at least one link under which the STA supports QTP among the multiple links and/or the link parameter of at least one link under which the STA supports QTP among the multiple links (e.g., a parameter of the SSD (e.g., priority and data volume, etc.), etc.) included in the received QTP request. The QTP response frame includes at least the link parameter of at least one link under which the AP supports QTP among the multiple links. The AP then sends this QTP response frame to the STA for QTP configuration.

The other steps of the flowchart of FIG. 4 are described in FIG. 2 and FIG. 3 and will not be repeated here.

Figure 5:
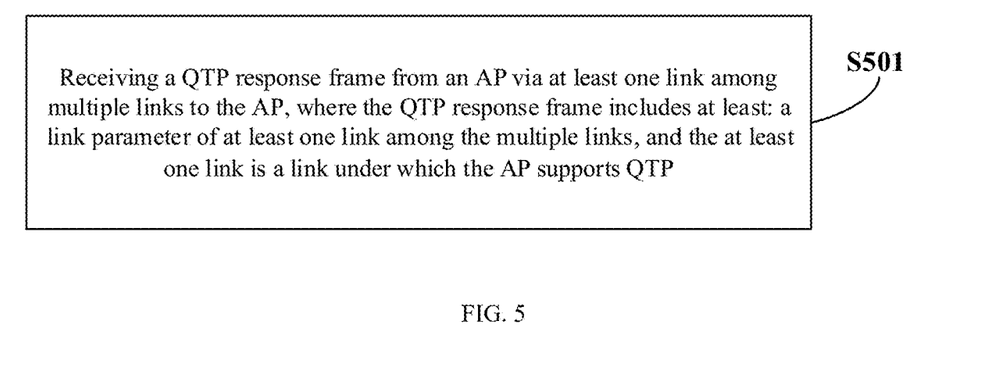
FIG. 5 is a flowchart of a multi-link communication method for a STA according to some embodiments of the present disclosure.

Referring to FIG. 5, the operations at the STA side is described in detail below.

FIG. 5 is a flowchart of a multi-link communication method performed by an STA according to some embodiments of the present disclosure, and with reference to FIG. 5, the multi-link communication method includes the following steps.

S501, receiving a QTP response frame from an AP via at least one link among multiple links to the AP, where the QTP response frame includes at least: a link parameter of at least one link among the multiple links, and the at least one link is a link under which the AP supports QTP.

The at least one link is a link for receiving the QTP response frame, or a link among the multiple links other than the link for receiving the QTP response frame, or the at least one link includes a link for receiving the QTP response frame and a link among the multiple links other the link for receiving the QTP response frame.

In some embodiments of the present disclosure, the QTP response frame is a link parameter for communication with the STA, which is determined by the AP based on an initial QTP configuration.

In some embodiments of the present disclosure, the initial QTP configuration may be an initial QTP configuration determined based on a communication protocol, or an initial QTP configuration determined based on a predetermined configuration, or an initial QTP configuration determined based on a QTP request frame sent by the STA. In some embodiments of the present disclosure, the initial QTP configuration includes at least: an identification of at least one link under which the STA supports QTP among the multiple links, and/or a link parameter of at least one link under which the STA supports QTP among the multiple links, and the at least one link is a link under which the AP supports QTP.

In some embodiments of the present disclosure, the initial QTP configuration is determined based on the QTP request frame sent by the STA. The method may further includes: sending a QTP request frame to the AP via at least one link among the multiple links.

The QTP request frame includes at least: an identification of at least one link under which the STA supports QTP among the multiple links, and/or a link parameter of at least one link under which the STA supports QTP among the multiple links.

The at least one link is a link for sending the QTP request frame, or a link among the multiple links other than the link for sending the QTP request frame, or the at least one link includes a link for sending the QTP request frame and a link among the multiple links other than the link for sending the QTP request frame.

In some embodiments of the present disclosure, the method includes: receiving the QTP response frame sent by the AP via at least one link among the multiple links to the AP.

The QTP response frame includes at least: a link parameter of at least one link among the multiple links, and the at least one link is a link under which the AP supports QTP.

The at least one link is a link for receiving the QTP response frame, or a link among the multiple links other than the link for receiving the QTP response frame, or the at least one link includes: a link for receiving the QTP response frame and a link among the multiple links other than the link for receiving the QTP response frame.

According to the embodiments of the present disclosure, as described above, the link under which the STA sends the QTP request frame is the same as or different from the link under which the STA receives the QTP response frame, i.e., the STA may utilize either Link1 or Link2 to send the QTP request frame and receive the QTP response frame.

According to the embodiments of the present disclosure, the link parameter of the QTP request frame include at least the QTP time offset parameter corresponding to the link supporting QTP.

According to the embodiments of the present disclosure, the link parameter of the QTP response frame include at least the QTP time offset parameter corresponding to the link supporting QTP.

According to the embodiments of the present disclosure, the time offset values of the different links are time offset values relative to the same time reference point; or, the time offset of one link is a time offset value relative to the time offset value of the other link.

According to the embodiments of the present disclosure, the time offset of the QTP supported by the STA, the time offset of the QTP supported by the AP, the identifier of the link under which the STA supports QTP in the multi-link communication, and the identifier of the link under which the AP supports QTP in the multi-link communication are the QTP communication parameters of at least one link among the multiple links, respectively.

According to the embodiments of the present disclosure, the multi-link communication method performed by the STA may further includes the steps as depicted in FIG. 3: sending an initial association request to the AP, where the initial association request contains multi-link capability information of the STA; receiving an initial association response from the AP, where the initial association response contains multi-link capability information of the AP; and, establishing a multi-link communication based on the multi-link capability information of the STA and the multi-link capability information of the AP.

According to the embodiments of the present disclosure, the multi-link capability information includes: support for simultaneous transmissions and receptions of the multi-link communication; support for simultaneous transmissions or receptions of the multi-link communication; and support for transmission and reception of a single link.

According to the above technical solutions provided by the embodiments of the present disclosure, the AP and the STA are able to communicate with each other under multiple links, and since the QTP of multiple links can be negotiated on one link of the multiple links, the signaling transmitted in the channel can be reduced, the system throughput can be increased, the load can be reduced, and thus the system performance can be improved.

Figure 6:
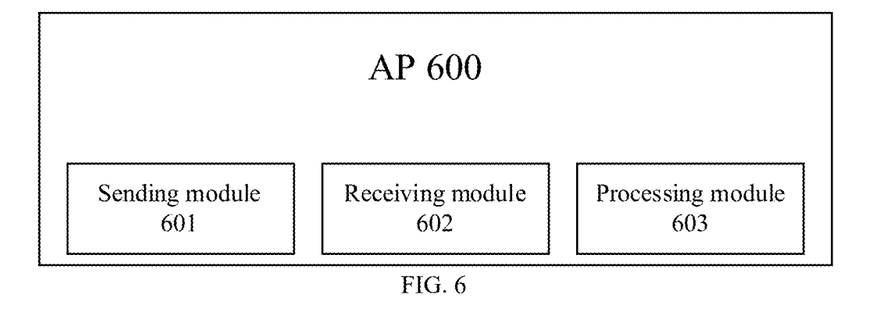
FIG. 6 is a block diagram of an AP according to some embodiments of the present disclosure.

FIG. 6 is a block diagram of an AP according to some embodiments of the present disclosure.

Referring to FIG. 6, the AP 600 according to the embodiments of the present disclosure includes a sending module 601.

The sending module 601 is configured to send, via at least one link among multiple links to a STA, a QTP response frame, where the QTP response frame includes at least a link parameter of at least one link among the multiple links, and the at least one link is a link under which the AP supports QTP;
where the at least one link is a link for sending the QTP response frame, or a link among the multiple links other than the link for sending the QTP response frame; or the at least one link comprises a link for receiving the QTP response frame and a link among the multiple links other than the link for sending the QTP response frame.

In some embodiments of the present disclosure, the AP 600 further includes a receiving module 602.

The receiving module 602 is configured to receive, via at least one link among the multiple links to the STA, a QTP request frame from the STA, where the QTP request frame includes at least: an identification of at least one link under which the STA supports QTP among the multiple links and/or a link parameter of at least one link under which the STA supports QTP among the multiple links;
where the at least one link is a link for receiving the QTP request frame, or a link among the multiple links other than the link for receiving the QTP request frame; or the at least one link comprises a link for receiving the QTP request frame and a link among the multiple links other than the link for receiving the QTP request frame.

According to some embodiments, the link for receiving the QTP request frame is the same or different from the link for sending the QTP response frame.

According to some embodiments, the link parameter of the QTP request frame includes at least a QTP time offset parameter corresponding to a link supporting QTP.

According to some embodiments, the link parameter of the QTP response frame includes at least a QTP time offset parameter corresponding to a link supporting QTP.

According to some embodiments, time offset values of different links are the time offset values relative to a same time reference point; or a time offset value of one link is the time offset value relative to a time offset value of another link.

According to some embodiments, a time offset of QTP supported by the STA, a time offset of QTP supported by the AP, an identifier of a link under which the STA supports QTP in the multi-link communication, and an identifier of a link under which the AP supports QTP in the multi-link communication are QTP communication parameters of at least one link among the multiple links, respectively.

According to some embodiments, the receiving module 601 is configured to receive an initial association request from the STA, where the initial association request contains multi-link capability information of the STA.

The sending module 602 is configured to send an initial association response to the STA, where the initial association response contains multi-link capability information of the AP.

In some embodiments of the present disclosure, the AP 600 further includes a processing module 603. The processing module 603 is configured to establish a multi-link communication based on the multi-link capability information of the STA and the multi-link capability information of the AP.

According to some embodiments, the multi-link capability information includes: support for simultaneous transmissions and receptions of the multi-link communication; support for simultaneous transmissions or receptions of the multi-link communication; and support for transmission and reception of a single link.

According to some embodiments, the processing module 603 is configured to determine the QTP response frame based on a parameter of a Basic Service Set (BSS) of the at least one link and a parameter of a service specific identifier (SSD) in the QTP request frame.

Figure 7:
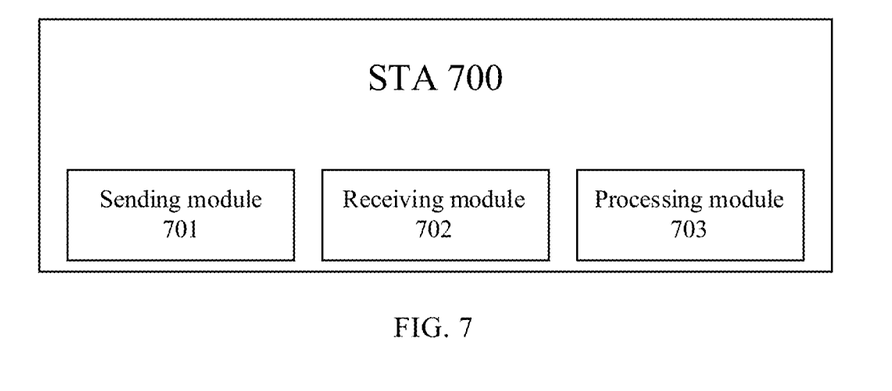
FIG. 7 is a block diagram of a STA according to some embodiments of the present disclosure.

FIG. 7 is a block diagram of a STA 500 according to some embodiments of the present disclosure.

Referring to FIG. 7, the STA 700 includes a receiving module 702.

The receiving module 702 is configured to receive, via at least one link among multiple links to a wireless access point (AP), a Quiet Time Period (QTP) response frame from the AP, where the QTP response frame includes at least a link parameter of at least one link among the multiple links, and the at least one link is a link under which the AP supports QTP;

where the at least one link is a link for receiving the QTP response frame, or a link among the multiple links other than the link for receiving the QTP response frame; or the at least one link comprises a link for receiving the QTP response frame and a link among the multiple links other than the link for receiving the QTP response frame.

According to some embodiments, the STA 700 further includes a sending module 701. The sending module 701 is configured to send, via at least one link among the multiple links, a QTP request frame to the AP.

where the QTP request frame includes at least: an identification of at least one link under which the STA supports QTP among the multiple links and/or a link parameter of at least one link under which the STA supports QTP among the multiple links;

where the at least one link is a link for sending the QTP request frame, or a link among the multiple links other than the link for sending the QTP request frame; or the at least one link comprises a link for sending the QTP request frame and a link among the multiple links other than the link for sending the QTP request frame.

According to some embodiments, the link for sending the QTP request frame is the same or different from the link for receiving the QTP response frame.

According to some embodiments, the link parameter of the QTP request frame includes at least a QTP time offset parameter corresponding to a link supporting QTP.

According to some embodiments, the link parameter of the QTP response frame includes at least a QTP time offset parameter corresponding to a link supporting QTP.

According to some embodiments, time offset values of different links are the time offset values relative to a same time reference point; or a time offset value of one link is the time offset value relative to a time offset value of another link.

According to some embodiments, a time offset of QTP supported by the STA, a time offset of QTP supported by the AP, an identifier of a link under which the STA supports QTP in the multi-link communication, and an identifier of a link under which the AP supports QTP in the multi-link communication are QTP communication parameters of at least one link among the multiple links, respectively.

According to some embodiments, the sending module 701 is configured to send an initial association request to the AP, where the initial association request contains multi-link capability information of the STA.

According to some embodiments, the receiving module 702 is configured to receive an initial association response from the AP, where the initial association response contains multi-link capability information of the AP.

According to some embodiments, the STA 700 further includes a processing module 703 configured to establish a multi-link communication based on the multi-link capability information of the STA and the multi-link capability information of the AP.

According to some embodiments, the multi-link capability information includes: support for simultaneous transmissions and receptions of the multi-link communication; support for simultaneous transmissions or receptions of the multi-link communication; and support for transmission and reception of a single link.

It should be noted that the "module" in FIGS. 6 and 7 can be implemented through a combination of software and/or hardware and are not specifically limited by the embodiments of the present disclosure.

According to one aspect of the present disclosure, there is provided an AP including a memory, a processor, and a computer program stored in the memory and runnable on the processor, where the processor, when executing the computer program, implements the multi-link communication method for the AP described above.

According to one aspect of the present disclosure, there is provided a STA including a memory, a processor, and a computer program stored in the memory and runnable on the processor, where the processor, when executing the computer program, implements the multi-link communication method for the STA described above.

According to some embodiments of the present disclosure, there is also provided a non-transitory computer-readable storage medium having a computer program stored thereon, where the computer program, when executed by a processor, causes the processor to implement the multi-link communication methods described above.

The above technical solutions provided according to embodiments of the present disclosure enable devices to communicate under multiple links and increase system throughput.

In exemplary embodiments, the processor may be a logic box, module, and circuit for implementing or executing various examples described in conjunction with the present disclosure, for example, a Central Processing Unit (CPU), a general purpose processor, a Digital Signal Processor (DSP), an Application Specific Integrated Circuit (ASIC), a Field Programmable Gate Array (FPGA), or other programmable logic devices, transistor logic devices, hardware components, or any combination thereof. The processor can also be a combination that implements computing functions, such as a combination containing one or more microprocessors, combinations of DSPs and microprocessors, etc.

In exemplary embodiments, the memory may be, for example, Read Only Memory (ROM), Random Access Memory (RAM), Electrically Erasable Programmable Read Only Memory (EEPROM), Compact Disc Read Only Memory (CD-ROM) or other optical disc storage, optical disk storage (including compact disc, laser disc, CD-ROM, digital universal disc, Blu-ray disc, etc.), disk storage media or other magnetic storage device, or may be any other mediums that can be used to carry or store program code in the form of instructions or data structures and accessed by a computer, which is not limited.

It should be understood that although the individual steps in the flowchart of the accompanying drawings are shown sequentially as indicated by the arrows, the steps are not necessarily performed sequentially in the order indicated by the arrows. Except as expressly stated herein, there is no strict sequential limitation on the execution of these steps, which may be performed in any other order. In addition, at least some of the steps in the flowchart of the accompanying drawings may include a plurality of sub-steps or a plurality of phases, which are not necessarily executed at the same moment of completion, but may be executed at different moments, and the order of their execution is not necessarily sequential, but may be executed in rotation or alternately with other steps or at least some of the sub-steps or phases of other steps.

Although the present disclosure has been shown and described with reference to certain embodiments of the present disclosure, it will be understood by those skilled in the art that various changes in form and detail can be made without departing from the scope of the present disclosure. Accordingly, the scope of the present disclosure should not be limited by the embodiments, but should be defined by the appended claims and their equivalents

What is claimed is:

1. A multi-link communication method, comprising:
   sending, by a wireless access point (AP) and via at least one link among multiple links to a station (STA), a Quiet Time Period (QTP) response frame to the STA, wherein the QTP response frame comprises at least a link parameter of at least one link for QTP among the multiple links, and the at least one link for QTP is a link under which the AP supports QTP;
   wherein the QTP response frame is sent over a link of the multiple links, or the QTP response frame is sent over two links of the multiple links,
   wherein a time offset of QTP supported by the STA, a time offset of QTP supported by the AP, an identifier of a link under which the STA supports QTP in the multi-link communication, and an identifier of a link under which the AP supports QTP in the multi-link communication are link parameters of at least one link for QTP among the multiple links, respectively.

2. The method of claim 1, further comprising:
   receiving, by the AP and via at least one link among the multiple links to the STA, a QTP request frame from the STA, wherein the QTP request frame comprises at least one of following parameters: an identification of at least one link for QTP under which the STA supports QTP among the multiple links, or a link parameter of at least one link for QTP under which the STA supports QTP among the multiple links;
   wherein the QTP request frame is received over a link of the multiple links, or the QTP request frame is received overt wo links of the multiple links.

3. The method of claim 2, wherein the at least one link for receiving the QTP request frame is the same or different from the at least one link for sending the QTP response frame.

4. The method of claim 2, wherein
   the link parameter of the QTP request frame comprises at least a QTP time offset parameter corresponding to a link supporting QTP.

5. The method of claim 4, wherein
   time offset values of different links are time offset values relative to a same time reference point; or
   a time offset value of one link is a time offset value relative to a time offset value of another link.

6. The method of claim 2, wherein
   the link parameter of the QTP response frame comprises at least a QTP time offset parameter corresponding to a link supporting QTP.

7. The method of claim 2, further comprising:
   determining, by the AP, a link parameter to be included in the QTP response frame based on a parameter of a Basic Service Set (BSS) of the at least one link supporting QTP and a parameter of a service specific identifier (SSD) of at least one link for QTP under which the STA supports QTP among the multiple links in the QTP request frame.

8. The method of claim 1, further comprising:
   receiving, by the AP, an initial association request from the STA, wherein the initial association request comprises multi-link capability information of the STA;
   sending, by the AP, an initial association response to the STA, wherein the initial association response comprises multi-link capability information of the AP; and
   establishing, by the AP, a multi-link communication based on the multi-link capability information of the STA and the multi-link capability information of the AP.

9. The method of claim 8, wherein the multi-link capability information comprises:
   support for simultaneous transmissions and receptions of the multi-link communication;
   support for simultaneous transmissions or receptions of the multi-link communication; and
   support for transmission and reception of a single link.

10. A multi-link communication method, comprising:
    receiving, by a station (STA) and via at least one link among multiple links to a wireless access point (AP), a Quiet Time Period (QTP) response frame from the AP, wherein the QTP response frame comprises at least a link parameter of at least one link for QTP among the multiple links, and the at least one link for QTP is a link under which the AP supports QTP;
    wherein the QTP response frame is received over a link of the multiple links, or the QTP response frame is received over two links of the multiple links,
    wherein a time offset of QTP supported by the STA, a time offset of QTP supported by the AP, an identifier of a link under which the STA supports QTP in the multi-link communication, and an identifier of a link under which the AP supports QTP in the multi-link communication are link parameters of at least one link for QTP among the multiple links, respectively.

11. The method of claim 10, further comprising:
    sending, by the STA and via at least one link among the multiple links, a QTP request frame to the AP, wherein the QTP request frame comprises at least one of following parameters: an identification of at least one link for QTP under which the STA supports QTP among the multiple links or a link parameter of at least one link for QTP under which the STA supports QTP among the multiple links;
    wherein the QTP request frame is sent over a link of the multiple links, or the QTP request frame is sent over two links of the multiple links.

12. The method of claim 11, wherein the at least one link for sending the QTP request frame is the same or different from the at least one link for receiving the QTP response frame.

13. The method of claim 11, wherein
    the link parameter of the QTP request frame comprises at least a QTP time offset parameter corresponding to a link supporting QTP.

14. The method of claim 13, wherein
    time offset values of different links are time offset values relative to a same time reference point; or
    a time offset value of one link is a time offset value relative to a time offset value of another link.

15. The method of claim 11, wherein
    the link parameter of the QTP response frame comprises at least a QTP time offset parameter corresponding to a link supporting QTP.

16. The method of claim 10, further comprising:
    sending, by the STA, an initial association request to the AP, wherein the initial association request comprises multi-link capability information of the STA;

receiving, by the STA, an initial association response from the AP, wherein the initial association response comprises multi-link capability information of the AP; and establishing, by the STA, a multi-link communication based on the multi-link capability information of the STA and the multi-link capability information of the AP.

17. The method of claim 16, wherein the multi-link capability information comprises:

support for simultaneous transmissions and receptions of the multi-link communication;

support for simultaneous transmissions or receptions of the multi-link communication; and support for transmission and reception of a single link.

18. A wireless access point (AP), comprising: a memory, a processor and a computer program stored on the memory, wherein the processor, when executing the computer program, implements following acts:

sending, via at least one link among multiple links to a station (STA), a Quiet Time Period (QTP) response frame to the STA, wherein the QTP response frame comprises at least a link parameter of at least one link for QTP among the multiple links, and the at least one link for QTP is a link under which the AP supports QTP;

wherein the QTP response frame is sent over a link of the multiple links, or the QTP response frame is sent over two links of the multiple links, wherein a time offset of QTP supported by the STA, a time offset of QTP supported by the AP, an identifier of a link under which the STA supports QTP in the multi-link communication, and an identifier of a link under which the AP supports QTP in the multi-link communication are link parameters of at least one link for QTP among the multiple links, respectively.

* * * * *